(12) United States Patent
Kulläng

(10) Patent No.: US 10,894,318 B2
(45) Date of Patent: Jan. 19, 2021

(54) ROBOT CONTROLLER SYSTEM AND METHOD THEREFOR

(71) Applicant: ABB Schweiz AG, Baden (CH)

(72) Inventor: Roger Kulläng, Västerås (SE)

(73) Assignee: ABB Schweiz AG, Baden (CH)

(*) Notice: Subject to any disclaimer, the term of this patent is extended or adjusted under 35 U.S.C. 154(b) by 29 days.

(21) Appl. No.: 16/078,407

(22) PCT Filed: Feb. 23, 2016

(86) PCT No.: PCT/EP2016/053722
§ 371 (c)(1),
(2) Date: Aug. 21, 2018

(87) PCT Pub. No.: WO2017/144078
PCT Pub. Date: Aug. 31, 2017

(65) Prior Publication Data
US 2019/0022856 A1    Jan. 24, 2019

(51) Int. Cl.
*G06F 15/177* (2006.01)
*B25J 9/16* (2006.01)
(Continued)

(52) U.S. Cl.
CPC ........ *B25J 9/1602* (2013.01); *G05B 19/4083* (2013.01); *G05B 19/414* (2013.01);
(Continued)

(58) Field of Classification Search
CPC .. B25J 9/1602; G05B 19/414; G05B 19/4083; G05B 2219/34038;
(Continued)

(56) References Cited

U.S. PATENT DOCUMENTS 2,594,850 A    4/1952   Benander
6,301,634 B1*  10/2001  Gomi ................. B25J 9/161
                                                   710/267
(Continued)

FOREIGN PATENT DOCUMENTS

CN    104408519 A    3/2015
CN    104656609 A    5/2015
(Continued)

OTHER PUBLICATIONS

International Preliminary Report on Patentability Application No. PCT/EP2016/053722 dated May 8, 2018 9 pages.
(Continued)

*Primary Examiner* — Volvick Derose
(74) *Attorney, Agent, or Firm* — Whitmyer IP Group LLC

(57) ABSTRACT

A method for controlling an industrial robot are disclosed, wherein the method is performed by a robot controller system, the robot controller system includes a local part connected to an industrial robot and a remote cloud part connectable to the local part. The local part includes a first real-time partition and a second non-real-time partition, and the method includes the steps of: storing a local cache of a complete file system of the robot controller system in the second non-real-time partition; storing the complete file system in the remote cloud part; and controlling the industrial robot in real time from the first real-time partition.

8 Claims, 4 Drawing Sheets

(51) Int. Cl.
G06F 8/71 (2018.01)
G06F 8/656 (2018.01)
G05B 19/408 (2006.01)
G05B 19/414 (2006.01)
G06F 9/4401 (2018.01)

(52) U.S. Cl.
CPC ............... *G06F 8/656* (2018.02); *G06F 8/71* (2013.01); *G05B 2219/31333* (2013.01); *G05B 2219/31418* (2013.01); *G05B 2219/31422* (2013.01); *G05B 2219/34038* (2013.01); *G05B 2219/34258* (2013.01); *G05B 2219/34404* (2013.01); *G06F 9/4401* (2013.01)

(58) Field of Classification Search
CPC .......... G05B 2219/34404; G05B 2219/34258; G05B 2219/31422; G05B 2219/31418; G05B 2219/31333; G06F 8/656; G06F 8/71
USPC ............................................................ 713/2
See application file for complete search history.

(56) References Cited

U.S. PATENT DOCUMENTS

| | | | |
|---|---|---|---|
| 6,356,806 B1* | 3/2002 | Grob ...................... | B25J 9/1674 361/679.02 |
| 8,386,078 B1 | 2/2013 | Hickman et al. | |
| 8,452,451 B1 | 5/2013 | Francis, Jr. et al. | |
| 8,478,901 B1* | 7/2013 | Poursohi ............... | G06F 9/5038 709/238 |
| 8,594,850 B1 | 11/2013 | Gourlay et al. | |
| 8,639,644 B1 | 1/2014 | Hickman et al. | |
| 8,918,208 B1* | 12/2014 | Hickman ............... | B25J 9/1697 700/253 |
| 2002/0087232 A1* | 7/2002 | Lapham ................. | G06F 30/00 700/245 |
| 2002/0173877 A1* | 11/2002 | Zweig .................... | B25J 9/1689 700/245 |
| 2006/0212132 A1* | 9/2006 | Vothknecht ........... | G06F 9/4887 700/1 |
| 2007/0061041 A1* | 3/2007 | Zweig .................... | G05D 1/0261 700/245 |
| 2007/0136721 A1* | 6/2007 | Dunshea ............... | G06F 9/5077 717/174 |
| 2010/0287556 A1* | 11/2010 | Munz .................... | G06F 9/5044 718/102 |
| 2012/0254108 A1* | 10/2012 | Wedewer ............... | H04W 4/60 707/618 |
| 2013/0018507 A1* | 1/2013 | Haag ...................... | B25J 9/161 700/245 |
| 2013/0238572 A1* | 9/2013 | Prahlad ................. | G06F 3/0649 707/692 |
| 2013/0297678 A1* | 11/2013 | Schach .................. | H04L 67/42 709/203 |
| 2014/0074294 A1* | 3/2014 | Wu ....................... | G05B 19/414 700/264 |
| 2014/0222761 A1* | 8/2014 | Zhang ................... | G06F 11/1451 707/654 |
| 2014/0222765 A1* | 8/2014 | Chen ..................... | G06F 8/658 707/679 |
| 2015/0074658 A1* | 3/2015 | Gourlay ................. | F24F 11/62 717/172 |
| 2017/0203436 A1* | 7/2017 | Wei ....................... | B25J 9/161 |

FOREIGN PATENT DOCUMENTS

DE 102004045195 A1 4/2006
WO 2016004587 A1 1/2016

OTHER PUBLICATIONS

International Search Report and Written Opinion of the International Searching Authority Application No. PCT/EP2016/053722 Completed: Nov. 23, 2016; dated Dec. 1, 2016 14 pages.
Written Opinion of the International Searching Authority Application No. PCT/EP2016/053722 dated Feb. 15, 2018 9 pages.
European Office Action Application No. 16 706 171.2 dated Apr. 30, 2020 11 pages.

* cited by examiner

ROBOT CONTROLLER SYSTEM AND METHOD THEREFOR

TECHNICAL FIELD

The invention relates to a method for controlling an industrial robot, a robot controller, a robot controller system, a robot arrangement and a computer program product therefor.

BACKGROUND

Backing up data is today an important task that a robot controller of an industrial robot has been designed to handle. However, there are a lot of issues to deal with when it comes to a backup for a robot controller for an industrial robot. Where can the backup safely be stored? What is actually contained in the backup? Is the backup accessible?

In many cases, a backup is stored on a local disk of the robot controller, thus effectively putting it in harm's way in case the robot controller is damaged. If a user has many robots it is also a time consuming task to keep track of all of the unique backups for all of them.

Further, a backup may be too old to be relevant. The backup might have been taken several years earlier for an old version of a control software, or important data has added to the system after the backup was made, such as touch up of robot waypoints or renaming of I/O signals. If a robot controller is restored from a too old backup, a lot of manual labour to restore the machine to the original state needs to be spent.

Restoring a wrong backup, i.e. a backup from another robot controller, to a robot controller is also not reliable, since most robot controllers are rather unique. In reality very few robots have exactly the same real-time program and configuration file. Restoring a robot controller from a wrong backup could be potentially dangerous since a robot could be moving in an unpredictable way.

US 2012/254108 describes a technology for synchronization of data between a robotic device and a cloud storage device. CN 104656609 describes a robot remote real-time monitoring method.

SUMMARY

It is an object of the present invention increase production uptime for a robot and at the same time mitigating the risk that critical production data would be lost.

According to a first aspect of the present invention a method for controlling an industrial robot is presented. The method is performed by a robot controller system, the robot controller system comprising a local part connected to an industrial robot and a remote cloud part connectable to the local part, the local part comprising a first real-time partition and a second non-real-time partition. The method comprises the steps of: storing a local cache of a complete file system of the robot controller system in the second non-real-time partition; storing the complete file system in the remote cloud part; and controlling the industrial robot in real time from the first real-time partition.

The first real-time partition may operate on a real-time operating system, and the second non-real-time partition may operate on general purpose operating system.

The method may further comprise the step of determining if the local cache is accurate or not, by comparing a first time stamp of the remote complete file system to a second time stamp of the local cache of the complete file system.

The method may further comprise the steps of: transmitting the remote complete file system to the local cache of the complete file system when the second time stamp of the local cache is determined to be older than the first time stamp of the remote cloud part; and transmitting the local cache of the complete file system to the remote cloud part when the first time stamp of the remote cloud part is determined to be older than the second time stamp of the local cache.

According to a second aspect of the present invention, a robot controller for an industrial robot is presented. The robot controller is connected to an industrial robot and is connectable a remote cloud part, the robot controller comprising a local first real-time partition and a local second non-real-time partition, wherein the first real-time partition is configured to control the industrial robot in real-time, the second non-real-time partition is configured to store a local cache of a complete file system stored in the remote cloud part.

The first real-time partition may be configured to operate on a real-time operating system and the second non-real-time partition may be configured to operate on general purpose operating system.

The remote cloud part may be provided with a first time stamp, the local cache may be provided with a second time stamp, and the robot controller may be configured to determine if the local cache is accurate or not by comparing the first and second time stamps.

The robot controller may be configured to receive the remote complete file system when the local cache is determined to be older than that of the remote cloud part, and may be configured to transmit the local cache of the complete file system when the remote cloud part is determined to be older than that of the local cache.

According to a third aspect of the present invention a robot arrangement is presented. The robot arrangement comprises an industrial robot and a robot controller.

According to a fourth aspect of the present invention a computer program product is presented. The computer program product comprises a computer program and computer readable storage means on which the computer program is stored. The computer program comprises computer program code which, when run on a processor of a robot controller, causes the robot controller to: store a local cache of a complete file system of the robot controller in a second non-real-time partition; store the complete file system of the robot controller in a remote cloud part; and control an industrial robot in real time from a first real-time partition.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Today many robot controllers for industrial robots host their own local file system in order for storing an application software along with user data. User data may be configuration parameters (such as CFG—configuration file, User-Authorization System—UAS, and network settings) and executable programs (e.g. in a RAPID programming language). The user data is critical for the operation of the industrial robot and users thereof, such as system integrators, production engineers and operators, spend a lot of time in creating and maintaining the user data.

Since so much effort has been put into creating the user data, the robot controller should have facilities to backup and persistently store the user data in a secure manner. The robot controller also needs a reliable and trusted way of restoring backup data back into the system in case something goes wrong with the robot controller. Faulty software upgrades, failing electronics, data corruption due to failing disks or misuse, and environmental hazards (such as fire and explosion) are examples of cases wherein something can go wrong.

With the Internet of Things and Industry 4.0 push, devices in general and robot controller in particular may increasingly be connected to cloud infrastructures that provide new services for the devices.

The present invention relates to how a robot controller is connected to a cloud infrastructure that provides a complete file system remotely. Local files for the robot controller are still used, but these files are offline copies or a local cache of the cloud based, remote complete file system. The local cache is to ensure that the robot controller can continue working in case of loss of communication with the cloud based, remote complete file system. A file system can contain a multitude of data depending on how a system is partitioned. A complete file system, able to control an industrial robot compromises: an operating system including drivers, a root file system (i.e. a directory structure), a robot controller application and user & system data.

As soon as a connection is established again, all file changes are synched back to the cloud for permanent storage.

Figure 1:
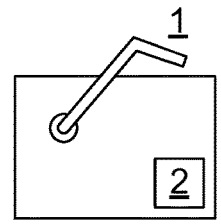
FIG. 1 is a schematic diagram illustrating a robot arrangement.

FIG. 1 schematically shows a robot arrangement comprising an industrial robot 1 connected to a robot controller system 2.

Figure 2:
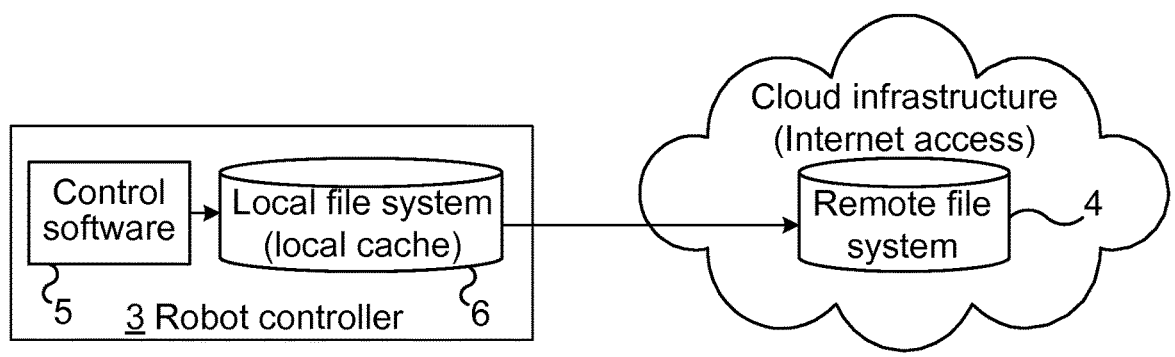
FIG. 2 is a schematic diagram illustrating a writing process according to an embodiment.

FIG. 2 schematically shows a write process, wherein new user data is to be stored in the file system.

A control software 5 is configured with a piece of data, for example a RAPID program, but could be any type of data. The configuration of the control software is stored in a local file system 6, which works like a local cache for the robot controller 3. The user data is also transmitted to a remote, complete file system 4 in a cloud infrastructure, as soon as a write operation has been committed to the local storage and a connection thereto exists. The user data is also stored in the remote, complete file system in the cloud.

If a connection to the remote, complete file system exists, and the local cache of the complete file system is newer than the remote, complete file system, the local cache of the complete file system is transmitted to the cloud infrastructure and is store into the remote, complete file system.

Figure 3:
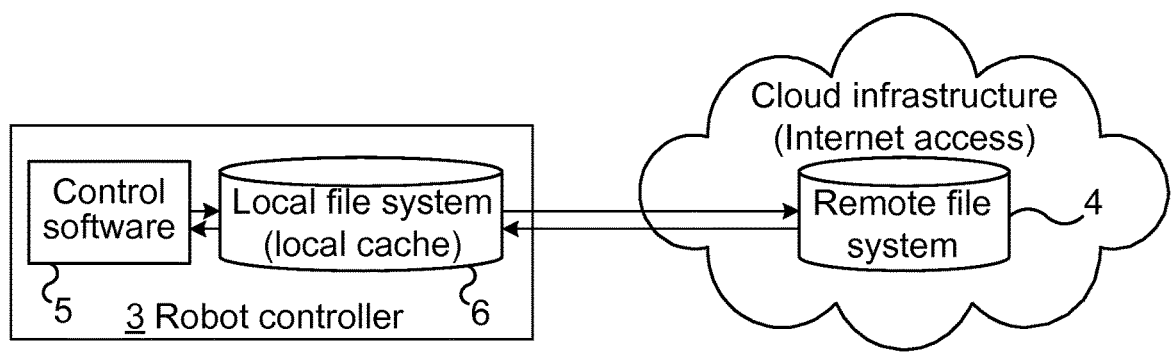
FIG. 3 is a schematic diagram illustrating a reading process according to an embodiment.

FIG. 3 schematically shows a read process, wherein user data is requested by the control software 5.

The control software 5 requests to read data from the local file system for a particular file, for example the RAPID program, but could be any type of user data. The robot controller checks if the local cache of the complete file system is newer or older than the remote, complete file system, if a connection thereto exist. If no connection exists, the data is read from the local file system.

If a connection to the remote, complete file system exists, and the remote, complete file system is newer than the local cache, the remote, complete file system is transmitted to the robot controller and is store into the local cache and read into the control software.

The complete file system is in this way always backed up in the cloud (as long as there is an established Internet connection). There is thus a very low risk that robot controller data is lost even if the robot controller is totally destroyed/bricked.

A seamless software upgrade may be used for a robot controller, since all data from old installation(s) can be available during the whole upgrade process and the entire upgrade can be prepared in the cloud infrastructure while the industrial robot is still running old software.

Each robot controller, of a plurality of robot controllers, may have its own cloud file system, backups and data stored in the cloud can always be available to exactly the right robot controller, i.e. dangerous mismatches are avoided.

The robot controller may have need of multiple versions of user data and robot software. Multiple versions may e.g. be used to allow a robot controller to revert to older versions of configurations or software. With the use of only a local cache of the current version, and possible older versions in the remote cloud storage, the amount of storage necessary for the local file system could be decreased thus lowering the cost of storage locally in the robot controller.

A cloud based file system may facilitate implementation of

Introducing file history for files stored in the cloud, e.g. to make it possible to undo file commits to the robot thus greatly increasing traceability of file changes.

Sharing data between robot controllers or with other users, since files need not be moved physically, but instead links could be shared to the different files or folders.

Advanced telemetry would be easier to access hence greatly improve error tracing capabilities.

Figure 4:
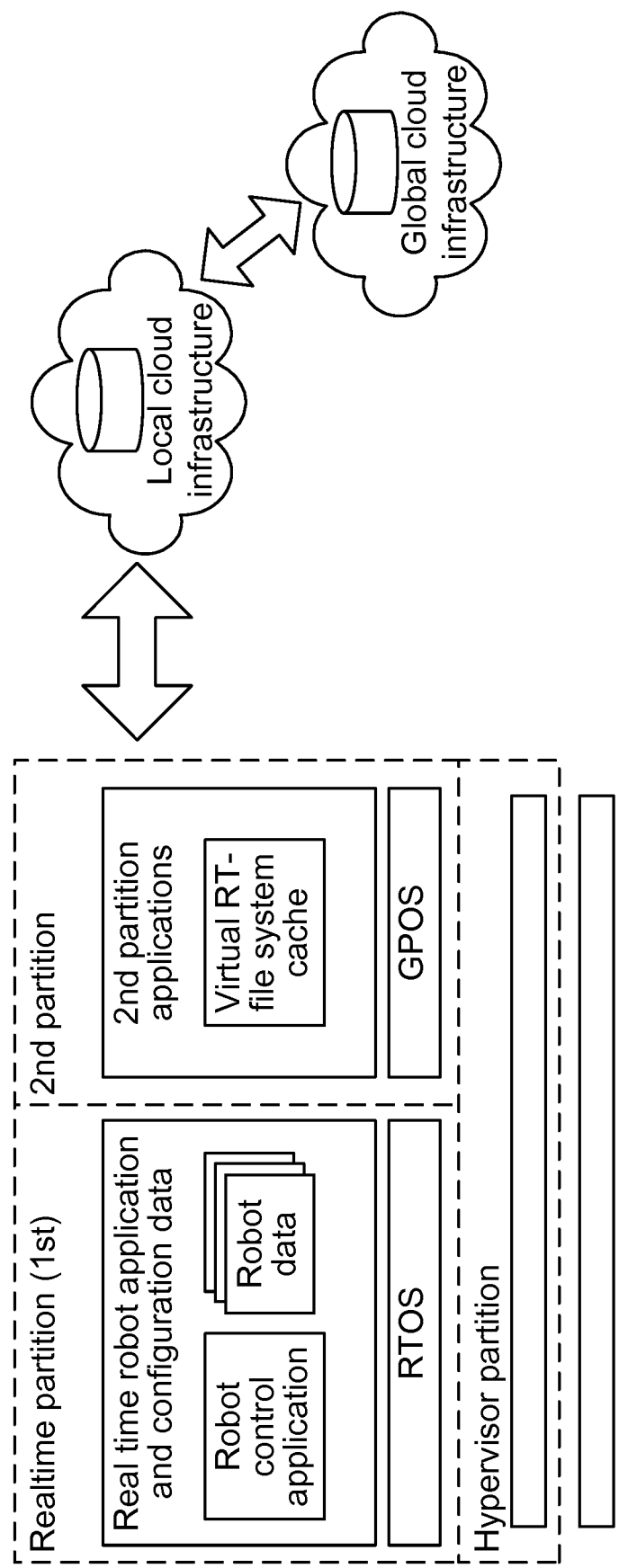
FIG. 4 is a schematic diagram illustrating partitioning of a robot controller according to an embodiment.

FIG. 4 schematically shows a robot controller system, configured for efficient use of cloud infrastructure.

The robot controller 3 connected to an industrial robot 1, has a local part and a remote cloud part 4. The local part is partitioned in first a real-time partition 5 and in a second non-real-time partition 6. The first real-time partition has the robot application and configuration data stored thereon to control the industrial robot in real-time. The first real-time partition may be running on a real-time operating system (RTOS, such as VxWorks or FreeRTOS). The second, non-real-time partition has a local cache of the complete file system stored thereon. The second, non-real-time partition may further have applications stored thereon, such as web servers, domain controllers, network protocols, file systems, and USB drivers. The second, non-real-time partition may be running on a general purpose operating system (GPOS, such as Windows or Linux).

The robot controller system may have a further, hypervisor partition for handling the first and second partitions.

The remote cloud part may be provided with a first time stamp, the local cache may be provided with a second time stamp, and the robot controller may be configured to determine if the local cache is accurate or not by comparing the first and second time stamps.

The robot controller may be configured to receive the remote complete file system when the local cache is determined to be older than that of the remote cloud part, and may be configured to transmit the local cache of the complete file system when the remote cloud part is determined to be older than that of the local cache.

The remote, complete file system is stored in a cloud infrastructure. The cloud infrastructure may be a local cloud infrastructure, a global cloud infrastructure, or a combination thereof. A local cloud infrastructure may e.g. be used, which in turn uses a global cloud infrastructure for backup.

Figure 5A:
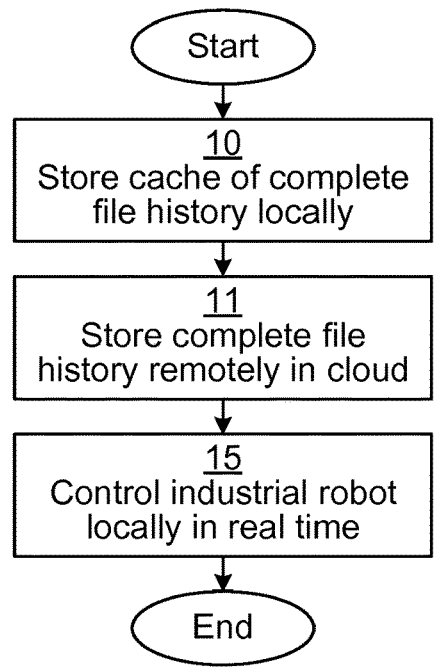
FIGS. 5A-5B are flow charts illustrating methods presented herein.

A method for controlling an industrial robot 1 according to an embodiment is presented with reference to FIG. 5A. The method is performed by a robot controller system 2, the robot controller system 2 comprises a local part 3 connected to an industrial robot 1 and a remote cloud part 4 connectable to the local part. The local part comprises a first real-time partition 5 and a second non-real-time partition 6, and the method comprising the steps of: storing 10 a local cache of a complete file system of the robot controller system in the second non-real-time partition 6; storing 11 the complete file system in the remote cloud part 4; and controlling 15 the industrial robot in real time from the first real-time partition 5.

The first real-time partition may be operating on a real-time operating system, and the second non-real-time partition may be operating on a general purpose operating system.

Figure 5B:
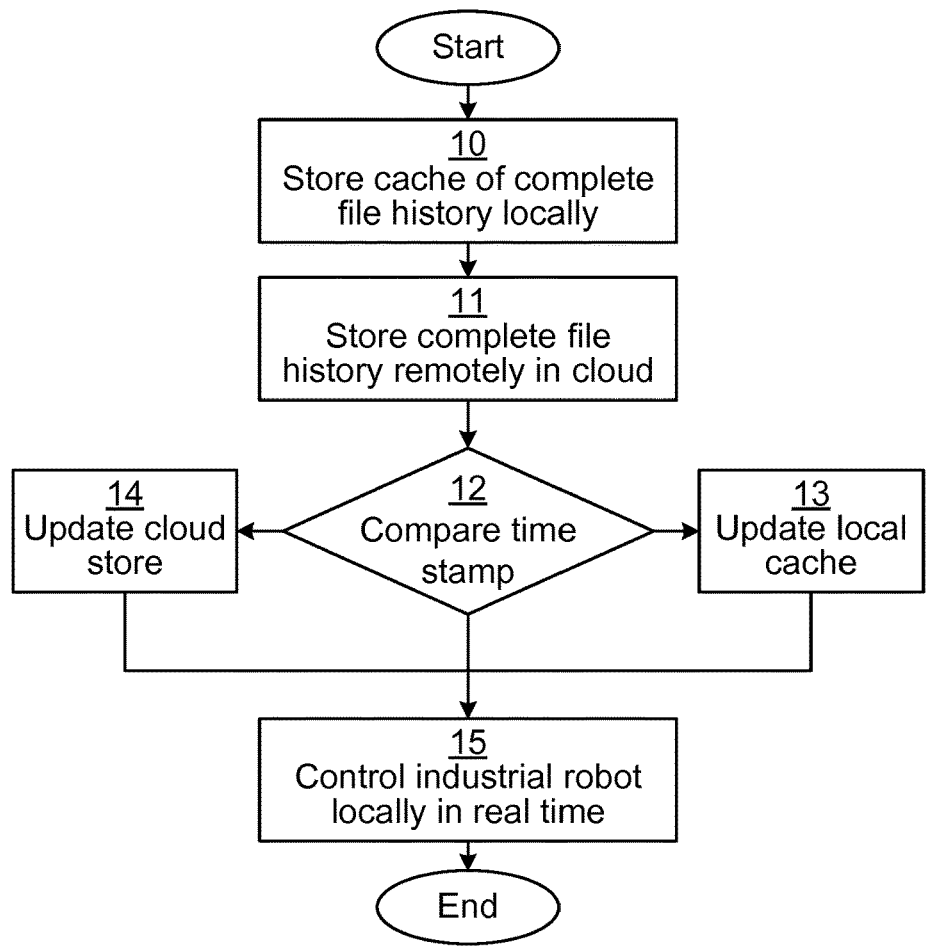

The method may comprise a further step of determining 12 if the local cache is accurate or not, by comparing a first time stamp of the remote complete file system to a second time stamp of the local cache of the complete file system. This is illustrated in FIG. 5B.

The method may comprise the further steps of: transmitting 13 the remote complete file system to the local cache of the complete file system when the second time stamp of the local cache is determined to be older than the first time stamp of the remote cloud part; and transmitting 14 the local cache of the complete file system to the remote cloud part when the first time stamp of the remote cloud part is determined to be older than the second time stamp of the local cache.

Figure 6:
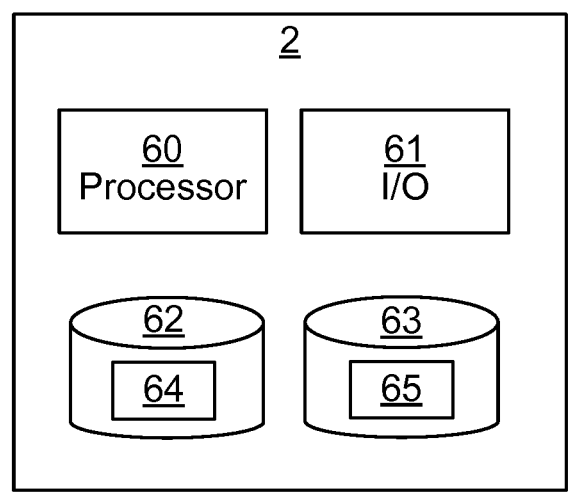
FIG. 6 is a schematic diagram illustrating some components of a robot controller according to an embodiment.

FIG. 6 shows some components of a robot controller system. A processor 6o may be provided using any combination of one or more of a suitable central processing unit, CPU, multiprocessor, microcontroller, digital signal processor, DSP, application specific integrated circuit etc., capable of executing software instructions of a computer program 64 stored in a memory. The memory can thus be considered to be or form part of a computer program product 62. The processor 60 may be configured to execute methods described herein with reference to FIGS. 5A-5B. The computer program may thus comprise computer program code which, when run on the processor 60 of a robot controller 2, causes the robot controller to: store 10 a local cache of a complete file system in a second non-real-time partition; store 11 the complete file system of the robot controller in a remote cloud part; and control 15 an industrial robot by the robot controller in real time from a first real-time partition.

A second computer program product 63 in the form of a data memory may also be provided, e.g. for reading and/or storing data during execution of software instructions in the processor 6o. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 65, to improve functionality for the robot controller system 2.

The robot controller system may further comprise an input/output, I/O, interface 61 including e.g. a user interface.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for controlling an industrial robot, the method being performed by a robot controller system, the robot controller system comprising a local part connected to an industrial robot and a remote cloud part connectable to the local part, the local part including a first real-time partition and a second non-real-time partition, wherein the first real-time partition is operating on a real-time operating system, and the second non-real-time partition operating on general purpose operating system, and the method including the steps of:
   storing a local cache of a complete file system of the robot controller system in the second non-real-time partition, wherein the complete file system comprises an operating system including drivers, a root file system, a robot controller application and user and system data;
   storing the complete file system in the remote cloud part; and
   controlling the industrial robot in real time from the first real-time partition.

2. The method according to claim 1, including a further step of determining if the local cache is accurate or not, by comparing a first time stamp of the remote complete file system to a second time stamp of the local cache of the complete file system.

3. The method according to claim 2, including the further steps of:
   transmitting the remote complete file system to the local cache of the complete file system when the second time stamp of the local cache is determined to be older than the first time stamp of the remote cloud part; and
   transmitting the local cache of the complete file system to the remote cloud part when the first time stamp of the remote cloud part is determined to be older than the second time stamp of the local cache.

4. A robot controller for an industrial robot, the robot controller being connected to an industrial robot and being connectable a remote cloud part, the robot controller including a local first real-time partition and a local second non-real-time partition, wherein the first real-time partition is operating on a real-time operating system and the second non-real-time partition operating on general purpose operating system, and wherein the first real-time partition is configured to control the industrial robot in real-time, the second non-real-time partition is configured to store a local cache of a complete file system stored in the remote cloud part, wherein the complete file system comprises an operating system including drivers, a root file system, a robot controller application and user and system data.

5. The robot controller according to claim 4, wherein the complete file system stored in the remote cloud part has a first time stamp, the complete file system stored in the local cache has a second time stamp, and the robot controller is configured to determine if the local cache is accurate or not by comparing the first and second time stamps.

6. The robot controller according to claim 5, wherein the robot controller is configured to receive the remote complete file system when the complete file system stored in the local cache is determined to be older than that of the remote cloud part, and is configured to transmit the complete file system stored in the local cache of the complete file system when the remote cloud part is determined to be older than that of the local cache.

7. A robot arrangement including an industrial robot and a robot controller connectable to a remote cloud part, the robot controller comprising a local first real-time partition and a local second non-real-time partition, wherein the first real-time partition is operating on a real-time operating system and the second non-real-time partition operating on general purpose operating system, and wherein the first real-time partition is configured to control the industrial robot in real-time, the second non-real-time partition is configured to store a local cache of a complete file system stored in the remote cloud part, wherein the complete file system comprises an operating system including drivers, a root file system, a robot controller application and user and system data.

8. A computer program product including a computer program and computer readable storage means on which the computer program is stored, the computer program including computer program code which, when run on a processor of a robot controller system, causes the robot controller to:
   store a local cache of a complete file system of the robot controller in a second non-real-time partition;
   store the complete file system of the robot controller in a remote cloud part, wherein the complete file system comprises an operating system including drivers, a root file system, a robot controller application and user and system data; and
   control an industrial robot in real time from a first real-time partition wherein the first real-time partition is operating on a real-time operating system, and the second non-real-time partition operating on general purpose operating system.

* * * * *